United States Patent [19]
Sheppard

[11] Patent Number: 5,165,749
[45] Date of Patent: Nov. 24, 1992

[54] GAS CAP COVER ADJUSTMENT DEVICE

[75] Inventor: Jonathan L. Sheppard, Ortonville, Mich.

[73] Assignee: Molmec, Inc., Walled Lake, Mich.

[21] Appl. No.: 733,679

[22] Filed: Jul. 22, 1991

[51] Int. Cl.⁵ .............................................. B60J 9/00
[52] U.S. Cl. .................................. 296/97.22; 220/86.2
[58] Field of Search ................. 296/97.22; 220/85 F, 220/86.2, DIG. 33

[56]   References Cited
U.S. PATENT DOCUMENTS

| | | | |
|---|---|---|---|
| 2,865,653 | 12/1958 | Nixon | 296/97.22 X |
| 4,467,937 | 8/1984 | Shaw | 220/86.2 X |
| 4,782,978 | 11/1988 | Appleby et al. | 296/97.22 X |
| 4,811,984 | 3/1989 | Hempel | 296/97.22 |
| 4,817,813 | 4/1989 | Krause | 220/DIG. 33 |

Primary Examiner—Margaret A. Focarino
Assistant Examiner—Joseph D. Pape
Attorney, Agent, or Firm—Reising, Ethington, Barnard, Perry & Milton

[57]   ABSTRACT

The invention generally relates to a cover assembly adapted to enclose a vehicle side panel opening to provide access to a gas tank filler tube and specifically relates to devices for adjusting a cover both laterally relative to the opening and so as to be flush with the side panel.

5 Claims, 4 Drawing Sheets

GAS CAP COVER ADJUSTMENT DEVICE

BACKGROUND OF THE INVENTION

The present invention relates to a device for adjusting a gas cap cover relative to a vehicle side panel recess within which a gas filler tube and its cap are located. It is desirable that such a cover be peripherally equally spaced within the recess opening and also be flush with respect to the surrounding vehicle body panel. Manufacturing and assembly tolerances are frequently such that the cover, when assembled to the vehicle, are improperly located with respect to such side panel recess. Accordingly, it is desirable to provide means for adjusting such gas cap recess cover relative to the recess and body panel to assure the proper location of such cover.

The present invention is particularly adapted to such an adjustment device wherein the cover assembly may be made of molded plastic parts.

PRIOR ART

The broad concept of a gas cap recess cover which is both peripherally adjustable relative to a recess opening and with respect to the outer surface of a body panel is shown in U.S. Pat. No. 4,811,984 Hempel. The device of the subject invention is structurally and functionally distinguishable from Hempel's device including being of a construction particularly adapted for use with molded plastic components. More specifically, Hempel utilizes a device which adjusts the goose-neck portion of a hinge arm in order to adjust both the peripheral spacing of the cover relative to the recess as well as to adjust its flushness with the vehicle body panel. In order to achieve this latter function, Hempel must also provide a secondary adjustment device disposed proximate the free end of the cove to complete the flushness adjustment relative to the side panel.

Applicant utilizes a first device disposed proximate the center of the cover for peripheral adjustment of the cover in combination with a cover hinge support member permitting adjustment of the cover normal to the outer vehicle body panel to assure a planar or flush relationship between the cover and body panel.

SUMMARY OF THE INVENTION

An opening is formed in a vehicle side panel and within which a pocket member is mounted and on the inner wall of which the outer portion of a gas tank filler tube is supported. The pocket member defines a recess the open outer end of which is disposed proximate the outer vehicle panel. A cover is pivotally supported on the pocket member to provide access to the gas tank filler tube. The invention relates to a device for adjustably locating the cover relative to the recess.

The device includes a hinge member which is pivotally mounted within the pocket member and is secured to the inside and central surface of the cover. The cover includes an integral raised portion formed on the inside surface thereof and which portion has a pair of laterally spaced bolt-receiving slots open at adjacent ends. The hinge member includes a goose-neck portion pivotally mounted within the pocket member and an elongated portion adapted to abuttingly overlay the raised portion of the cover. The elongated portion of the hinge member includes a pair of enlarged holes adapted to register with the bolt-receiving openings in the raised portion of the cover. An intermediate member is also adapted to coact with the raised portion of the cover and includes a pair of spaced studs integrally secured thereto such that the studs may slide through and be retained within the slots. Thus, the studs are adapted to project through the cover slots and the enlarged holes in the hinge member. Nuts ar adapted to coact with the studs to assemble and secure the cover, hinge and intermediate members as a unit. The holes in said hinge are of a larger diameter than that of the studs and cover slots which permit the cover to be laterally or peripherally adjusted relative to the hinge and panel opening.

The inner or vehicle body end of the hinge is pivotally mounted in a housing which, in turn, is mounted in the pocket member. The hinge housing includes slotted openings with which suitable screws coact to allow the hinge housing, hinge and cover to be adjusted in and out or normal to the vehicle side panel to enable the positioning of the cover flush with said panel.

The means by which the foregoing adjustments are achieved will be more clearly understood from the following description of a preferred embodiment of the invention selected for the purposes of illustration and having reference to the drawings wherein:

DESCRIPTION OF PREFERRED EMBODIMENT

Figure 1:
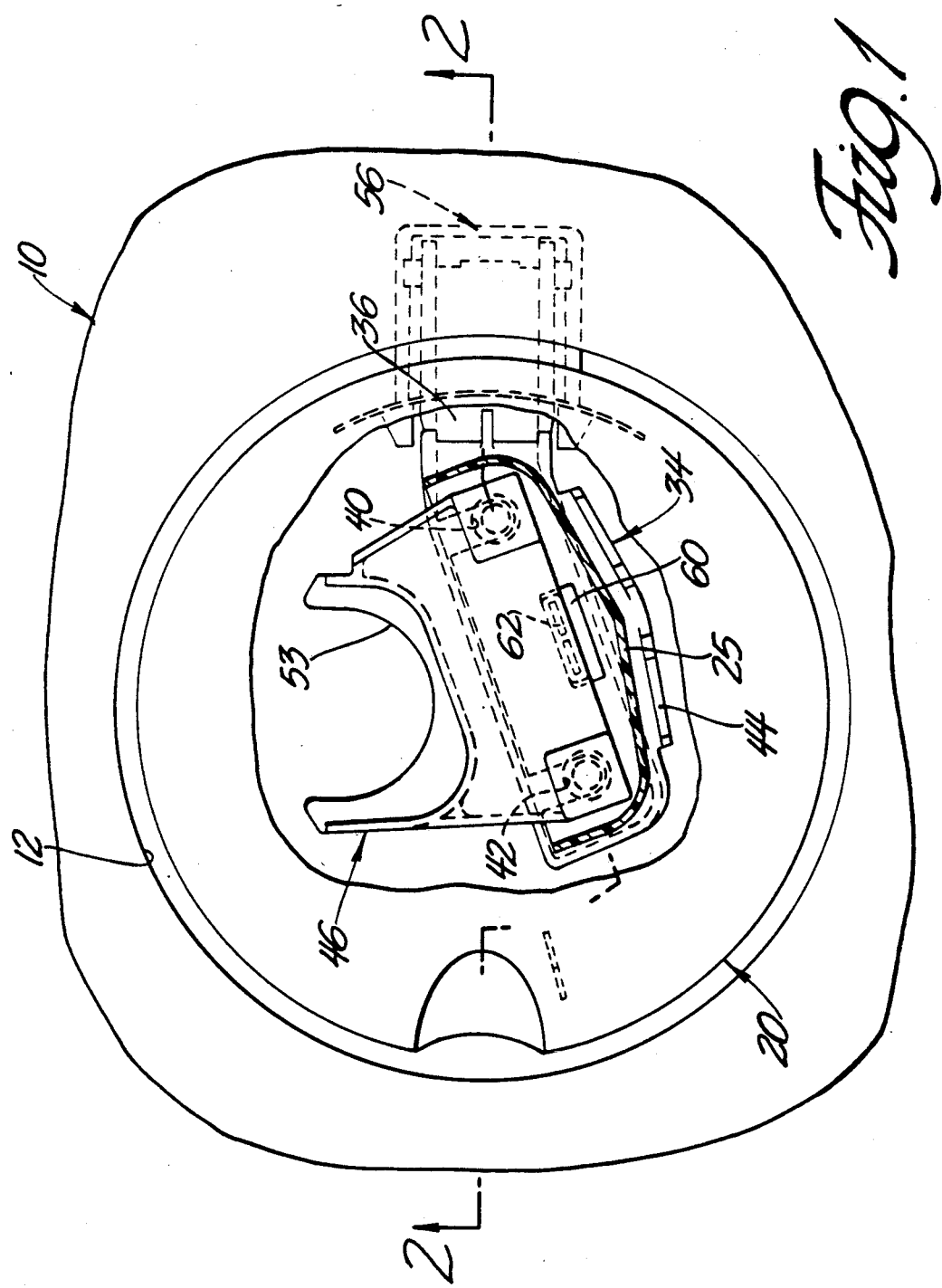
FIG. 1 is a bottom plan view of the gas cap cover assembly.

It is to be understood that the purposes of the subject invention are both to achieve a simplified gas cap cover adjusting device as well as one which is particularly adaptable to using molded plastic components.

A vehicle side panel is indicated generally at 10 and has an opening 12 within which a cylindrical plastic pocket member 14 is disposed. The inner wall 15 of the pocket member suitably supports the outer end of a gas filler tube 16 and its associated cap 18.

Figure 2:
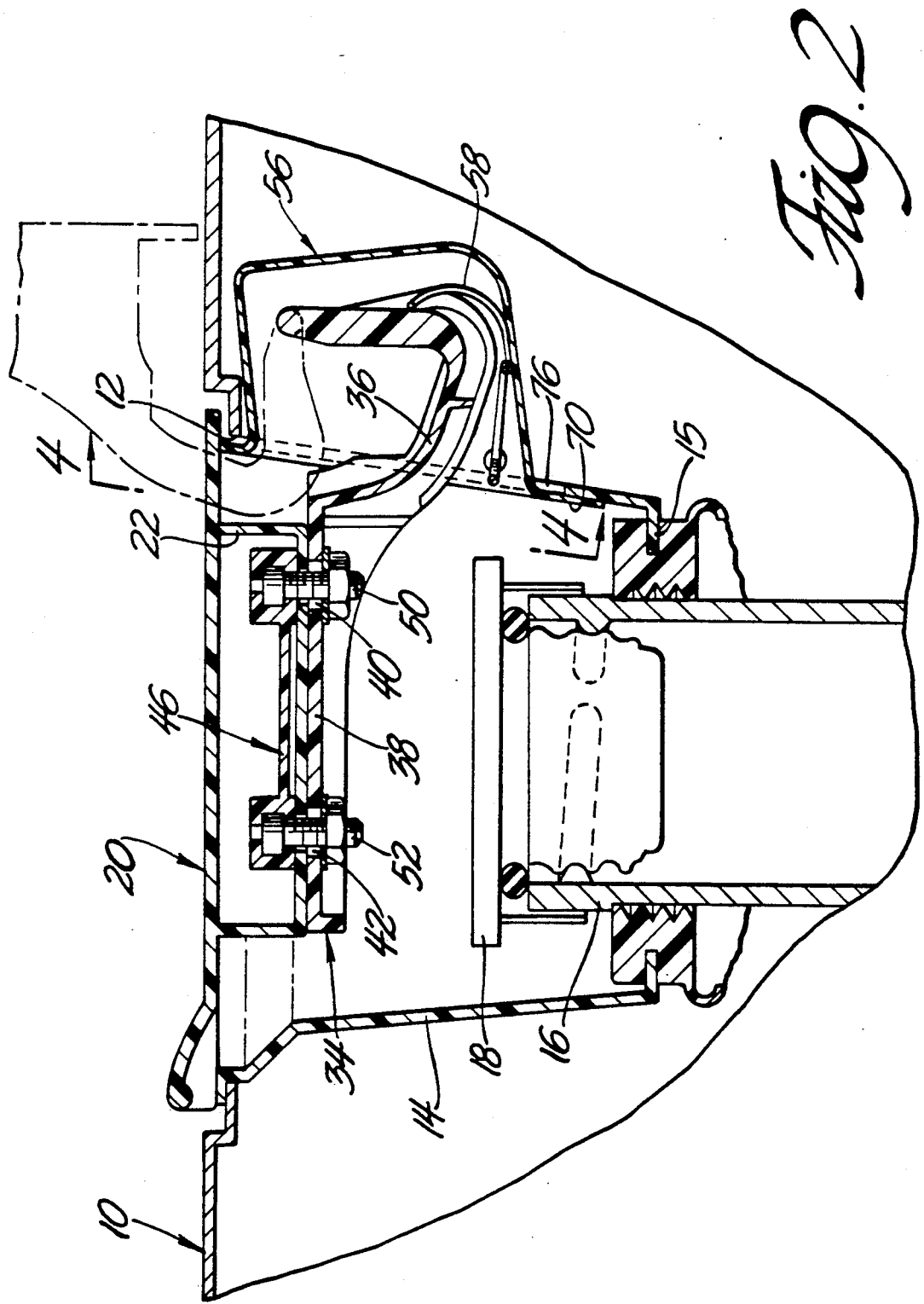
FIG. 2 is a view along line 2—2 of FIG. 1.
Figure 3:
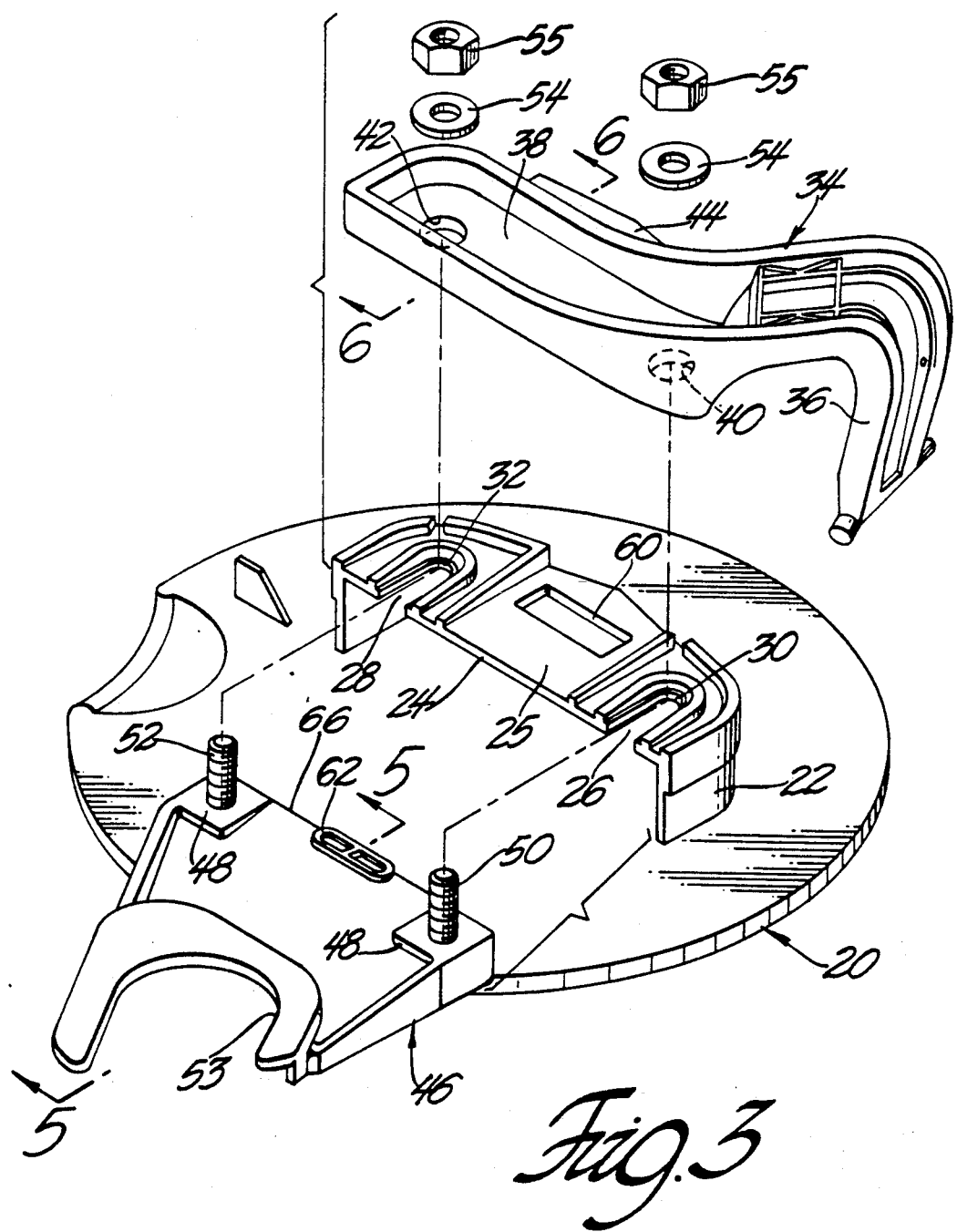
FIG. 3 is an exploded view of the components comprising the cover adjustment device.
Figure 4:
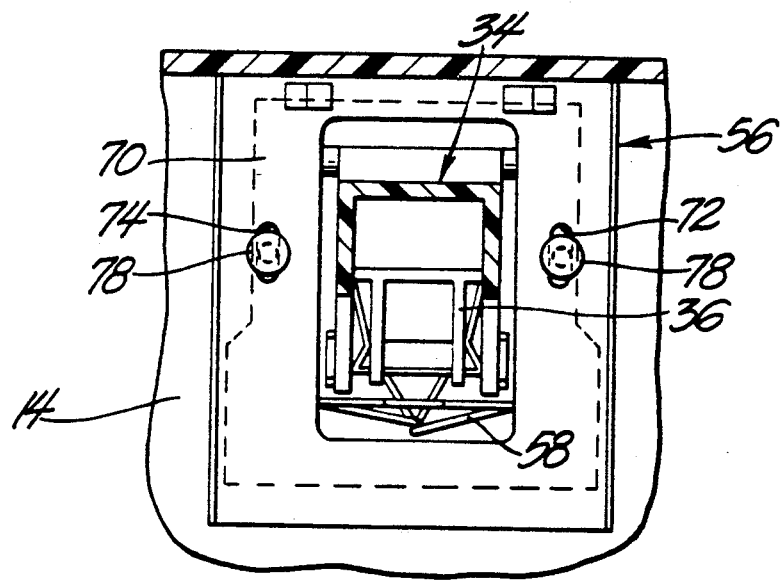
FIG. 4 is a view along line 4—4 of FIG. 2.

A side panel opening cover is indicated generally at 20 and, as best seen in FIGS. 2 and 3 includes a raised portion 22 integrally molded upon the inner surface thereof. A pair of laterally spaced slots 26 and 28 open from the innermost edge 24 of the upper wall 25 of raised portion 22 and terminate in closed ends 30 and 32. It is to be noted that edge 24 of raised portion 22 is proximate the center of the cover. Raised cover portion 22 includes an open side beneath edge 24 and a closed side or wall 25 laterally opposite the edge.

A hinge member is indicated generally at 34 and includes a goose-neck end portion 36 adapted to be suitably pivotally connected to pocket member 14 as hereinafter described. The hinge member includes an elongated portion 38 extending laterally from the goose-neck portion and having a pair of laterally spaced holes 40 and 42 which correspond in lateral spacing to that of cover slots 26 and 28.

The elongated portion 38 of hinge member 34 includes a depending lip 44, the purpose of which will be described subsequently.

An intermediate member is indicated generally at 46 and includes portions 48 within which a pair of threaded stud members 50 and 52 are integrally molded so as to project upwardly therefrom. Again, the lateral spacing of studs 50 and 52 corresponds to the lateral spacing of cover slots 26 and 28 and holes 40 and 42 of the hinge member.

Member 46 also includes a generally semicircular pocket 53 which can store the gas cap 18 when it is removed from filler tube 16 to add gas to the vehicle.

Figure 5:
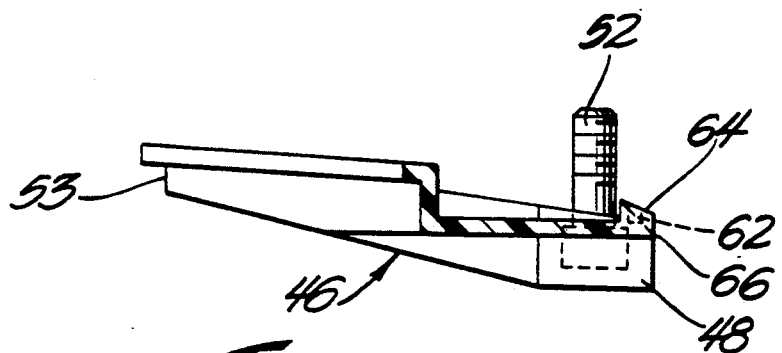
FIG. 5 is a side section along line 5—5 of FIG. 3.

As best seen in FIGS. 3 and 5, raised cover portion 22 includes a central rectangular opening 60 disposed between slots 26 and 28. Intermediate member 46 includes a raised projection 62 disposed between studs 50 and 52. As seen in FIG. 5 the upper surface 64 slopes downwardly toward front edge 66 of projection 62. As hereinafter described, projection 62 is adapted to snap within cover opening 60.

The manner in which the parts coact and are assembled to permit adjustment of cover 20 will now be described in greater detail. Particular reference is made to the exploded view of FIG. 3 to better understand the manner of assembly. Front edge 66 of intermediate member 46 is inserted within the raised portion 22 of cover 20 such that the studs slide through slots 26 and 28 to reside proximate the closed ends of the slots.

As member 46 is inserted within raised cover portion 22, inclined projection 62 engages and upwardly flexes upper wall 25 until the projection snaps within cover opening 60 to loosely retain member 46 to cover 20 to await the further assembly of parts.

Next, hinge member 34 is positioned over the cover member 20 so that holes 40 and 42 register with and slide over the stud members 50 and 52. With the parts so assembled, washers and nuts 54 and 55 are respectively dropped over and threaded to the stud members to loosely hold the assembled parts together.

Figure 6:
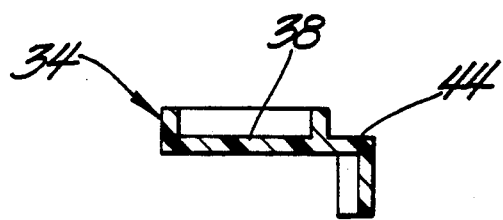
FIG. 6 is a view along line 6—6 of FIG. 3.

As best seen in FIGS. 1 and 6 and with the parts loosely assembled, lip 44 of hinge member 34 is spaced closely proximate wall 25 of raised portion 22 of the cover 20. Thus, even with the parts loosely assembled and retained by nuts 55, withdrawal of studs 50 and 52 out of cover slots 26 and 28 is prevented by hinge lip 44 abutting against wall portion 25 of the cover thereby preventing inadvertent disassembly of the parts.

The inner end of the goose-neck portion 36 is pivotally mounted within a housing 56 and coacts with an over-center spring 58 whereby the cover is held by the spring either in an open or closed position relative to the pocket recess 12. Hinge housing 56 includes a peripheral flange 70 having oppositely disposed slots 72 and 74 generally parallel to the longitudinal axis of the pocket member 14. A side opening 76 is formed in pocket 14 and is adapted to receive hinge housing 56 and be retained therein by screws 78 which coact with suitable holes in the pocket member. By loosening screws 78 the hinge housing 56, along with hinge 34 and cover 20, may be adjusted in and out relative to the pocket member to assure that cover 20 is flush or planar with respect to the vehicle panel 10.

The manner in which cover 20 may be adjusted peripherally relative to the recess opening will now be described. To permit such adjustment, the nuts 56 are loosened to allow relative lateral movement between the cover and the hinge member. Again as best seen in FIGS. 2 and 3, hinge member holes 40 and 42 are of substantially larger diameters than studs 50 and 52 thereby allowing the cover to be laterally or peripherally centered within recess 12. When thus centered, nut 55 is tightened to fix the centered position of cover 20.

As already noted, the pocket 14, hinge housing 56, hinge member 34 intermediate member 46 and cover 20 are preferably molded plastic parts. A mineral filled Nylon marketed under the tradename Minlon by DuPont has proved to be a satisfactory plastic for this use.

Other modifications are possible within the invention as set forth in the hereinafter appended claims.

What is claimed is:

1. A gas cap cover adjustment device of a type including a pocket member (14) mounted within an opening (12) in a vehicle outer panel (10), the pocket member includes a longitudinal axis generally normal to the panel, an inner wall (15) of the pocket member supports a fuel tank filler tube (16) and an associated gas cap (18), an outer end of said pocket defines an opening proximate said panel opening, a cover (20) enclosing the outer end of said pocket, a hinge member (34) is pivotally mounted at one end within the pocket member and secured to the inside surface of the cover and means for adjusting the cover relative to the body recess, the improvement in the adjustment means comprising:
   a raised portion (22) formed on the inside surface of the cover and having an upper wall (25), and a pair of laterally spaced parallel slots (26, 28) formed in said upper wall;
   the pocket member including a side-wall opening (76);
   a housing (56) having a peripheral flange (70) for mounting said housing within the side wall opening of the pocket member;
   means (72, 74, 78) for mounting said housing within said pocket member so as to be coaxially adjustable relative to said longitudinal axis;
   the hinge member including a goose-neck portion (36) pivotally mounted within said housing and an elongated portion (38) abuttingly overlaying the raised cover portion and including a pair of holes (40,42) registering with said cover slots;
   an intermediate member (46) including a pair of laterally spaced parallel studs (50, 52) projecting from the same side thereof, at least a part of the intermediate member disposed within the raised portion of the cover such that the studs slide through and reside within the cover slots, said studs projecting through the cover slots and the holes in the hinge members;
   nuts (55) coacting with the studs secure the cover, hinge and intermediate members together as a unit, the cover slots and hinge holes being sufficiently larger than the stud diameters to permit said cover to be laterally adjusted relative to the pocket opening when the nuts are loosened on said studs.

2. A gas cap cover adjustment device as set forth in claim 1 wherein the raised cover portion (22) and the intermediate member (46) respectively include coacting elements (60, 62) for releasably and loosely locking the intermediate member to said cover when said member is inserted within said raised cover portion.

3. A gas cap cover adjustment device as set forth in claim 1 wherein the upper wall (25) of the cover raised portion includes a recess (60), and the intermediate member (46) includes a projection (62) positionable within said recess when said member is inserted within said raised cover portion.

4. A gas cap cover adjustment device as set forth in claim 3 wherein said projection is smaller than said recess in order to permit relative movement between said cover and said intermediate member.

5. A gas cap cover adjustment as set forth in claim 1 wherein the elongated portion (38) of the hinge member includes a depending lip (44) coacting with the raised cover portion (22) to prevent the cover and the intermediate member from being disassembled from the hinge member when the nuts are loosened in said studs.

* * * * *